(12) United States Patent
Kabalnov

(10) Patent No.: US 6,786,955 B2
(45) Date of Patent: Sep. 7, 2004

(54) COLOR INK-JET INKS HAVING IMPROVED DECAP WITHOUT AFFECTING COLOR-TO-BLACK BLEED CONTROL

(75) Inventor: Alexey S Kabalnov, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 131 days.

(21) Appl. No.: 10/118,383

(22) Filed: Apr. 5, 2002

(65) Prior Publication Data

US 2003/0188662 A1 Oct. 9, 2003

(51) Int. Cl.$^7$ .............................................. C09D 11/02
(52) U.S. Cl. ................. 106/31.27; 106/31.59
(58) Field of Search ................ 106/31.27, 31.59

(56) References Cited

U.S. PATENT DOCUMENTS

| | | | |
|---|---|---|---|
| 5,091,005 A | 2/1992 | Mueller et al. ............. 347/100 |
| 5,116,409 A | 5/1992 | Moffatt ..................... 106/31.57 |
| 5,196,056 A | 3/1993 | Prasad ...................... 106/31.58 |
| 5,205,861 A | 4/1993 | Matrick .................... 106/31.47 |
| 5,342,440 A | 8/1994 | Wickramanayake ..... 106/31.49 |
| 5,518,534 A | 5/1996 | Pearlstine et al. ........ 106/31.75 |
| 5,536,306 A | 7/1996 | Johnson et al. .......... 106/31.49 |
| 5,555,008 A | 9/1996 | Stoffel et al. ............. 347/100 |
| 5,725,647 A | 3/1998 | Carlson et al. ........... 106/31.86 |
| 5,766,327 A | 6/1998 | Maze ....................... 106/31.58 |
| 5,830,265 A | 11/1998 | Tsang et al. ............. 106/31.75 |
| 5,853,465 A | 12/1998 | Tsang et al. ............. 106/31.25 |
| 5,891,934 A | 4/1999 | Moffatt et al. ............. 523/161 |
| 5,985,016 A | 11/1999 | Tsang et al. ............. 106/31.64 |
| 6,001,899 A * | 12/1999 | Gundlach et al. .......... 523/160 |
| 6,015,206 A | 1/2000 | Heydinger et al. .......... 347/43 |
| 6,036,759 A | 3/2000 | Wickramanayake et al. ..... 106/31.28 |
| 6,054,505 A | 4/2000 | Gundlach et al. |
| 6,086,198 A | 7/2000 | Shields et al. ............. 347/100 |
| 6,136,890 A | 10/2000 | Carlson et al. ............. 523/160 |
| 6,177,498 B1 | 1/2001 | Rehman .................... 524/388 |
| 6,221,142 B1 | 4/2001 | Wang et al. ................ 106/31.6 |
| 6,248,162 B1 * | 6/2001 | Gundlach et al. ........ 106/31.58 |
| 6,258,873 B1 | 7/2001 | Gundlach et al. ........... 523/160 |
| 6,264,731 B1 * | 7/2001 | Gundlach et al. ........ 106/31.58 |

FOREIGN PATENT DOCUMENTS

| EP | 0 839 883 | 5/1998 |
|---|---|---|
| EP | 1 103 585 | 5/2001 |

* cited by examiner

*Primary Examiner*—Helene Klemanski (57) ABSTRACT

The present invention relates to an ink-jet ink comprising an improved black-to-color bleed control agent in color inks having better decap properties. The improved bleed control agent comprises a multivalent salt of a perchlorate anion. A method of using the ink-jet ink is also provided. The method comprises formulating the color ink-jet ink with the improved bleed control agent and applying the color ink-jet ink adjacent to a black ink-jet ink on a paper substrate. A method of improving decap of an ink set without affecting color-to-black bleed control is also provided.

21 Claims, 6 Drawing Sheets

COLOR INK-JET INKS HAVING IMPROVED DECAP WITHOUT AFFECTING COLOR-TO-BLACK BLEED CONTROL

FIELD OF THE INVENTION

The present invention relates to a color ink for thermal ink-jet printing, and, more specifically, to a color ink comprising an improved decap agent that improves the decap time of the ink without affecting the color-to-black bleed control.

BACKGROUND OF THE INVENTION

Ink-jet printers are commonly used in offices and homes because of their low cost and high print quality. Recently, ink-jet printers capable of printing images in both black and color have been developed. To print color images, the printers use a combination of cyan, magenta, and yellow inks to produce the colors of the color spectrum. Color ink-jet inks are typically aqueous based and are formulated by dissolving a colorant, such as a dye or pigment, in an ink vehicle. For example, a yellow ink would comprise a yellow dye or pigment dissolved or dispersed in an ink vehicle. Color dyes and pigments are known in the art. The dyes used in color inks are typically present in salt form and are designed to form solids in a substrate, such as a paper substrate, by crystallizing the dye on the substrate. The ink vehicle may also contain numerous other components, as discussed herein, depending on the application and desired properties of the color ink-jet ink.

Typical commercial ink-jet printers contain at least 4 inks, one being black and the other three being, cyan, magenta and yellow. When color and black ink areas are printed adjacent to each other, for example, on graphical diagrams, it is important to keep a good edge definition, or bleed, between the colors and the black.

Regardless of the application, a color ink-jet ink should have good print qualities. An optimal color ink would have a long decap time, low color-to-black bleed, low color-to-color bleed, a fast drying time, high resistance to light fade, and a long shelf-life. However, there is usually a tradeoff between achieving these properties because improving one property results in the deterioration of another property. In particular, there is usually a tradeoff between optimizing decap and bleed control in color inks.

The term "decap" refers to the ability of the ink-jet ink to remain fluid upon exposure to air. The decap time of the ink is measured as the amount of time that an ink printhead can be left uncapped before the printer nozzles will clog or plug. The nozzles can become plugged by a viscous plug forming in one or more of the nozzles, by crusting of the ink, or by crystallization of the dye in or around any of the nozzles. If a nozzle has plugged, ink droplets ejected through the nozzle's orifice may be misdirected, which may adversely affect print quality.

If the orifice is completely blocked, ink droplets may not pass at all through the affected nozzle. Decap times of ink-jet inks are typically measured over short and long periods of time. The short time decap is an important factor that determines how long the printhead can print without "spitting". Because not all the nozzles of the printhead print all the time, the printer service routine requires the idle nozzles to spit on a regular basis into the waste container (spittoon) to avoid printing defects. It is desirable, therefore, to keep the short-time decap as long as possible because it improves throughput and saves inks. On the other hand, long-time decap determines how long a printhead can be stored in an uncapped state. In particular, it determines such attributes of the printhead as the storage stability. A preferred color ink would be able to be left uncapped and unused for extended periods of time without plugging.

A preferred ink would also have low color-to-black bleed properties. Bleed is the dye diffusion that takes place when one ink dot is printed next to another. When multiple colors are printed on the paper, the colors may bleed into one another as the colors mix on the surface of the paper or within the paper. To have optimal print quality, it is preferable that the colors do not mix with each other or with black ink. In addition, it is preferable that there is a clean border between colors and between colors and black ink.

Various solutions have been disclosed to improve the color-to-black bleed of color inks, including adding heat sources to the printers, developing special papers, and increasing the penetration rate of the color ink into the paper.

While various solutions have been proposed that improve decap or color-to-black bleed control of color inks, the prior art is silent about improving one of these properties without affecting the other property. Since these two properties are usually inversely related, it would be advantageous to develop a color ink-jet ink that has improved decap but does not affect color-to-black bleed control.

SUMMARY OF THE INVENTION

In accordance with the invention, a color ink-jet ink is provided in which decap is improved without affecting the color-to-black bleed control of the ink. This is accomplished by adding an improved decap agent to the color ink-jet ink. The improved decap agent comprises a multivalent salt of a perchlorate anion, where the cations of the perchlorate anion include calcium, manganese, magnesium, zinc, aluminum, and iron. The specific color ink-jet ink formulated in accordance with the invention displays improved or unchanged decap without affecting the color-to-black bleed control of the ink.

A method of using the color ink-jet ink is also provided. The method comprises formulating the color ink-jet ink comprising about 0.1 to 10 wt % of an improved decap agent comprising a multivalent salt of a perchlorate anion. The color ink-jet ink is applied on paper, adjacent to black ink-jet ink. The color ink-jet ink achieves improved decap of the color ink-jet ink without affecting color-to-black bleed control.

In addition, a method of improving decap without affecting color-to-black bleed control of a color ink-jet ink is provided. The method comprises formulating a color ink-jet ink comprising about 0.1 to 10 wt % of an improved decap agent comprising a multivalent salt of a perchlorate anion.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

Improved decap agents are used in the practice of this invention to improve decap without affecting the ink's color-to-black bleed control. The improved decap agent must be soluble in the color ink-jet ink in the concentration employed. Preferably, the improved decap agent is an inorganic salt that comprises a multivalent salt of a perchlorate anion. The cations of the salt include calcium, manganese, magnesium, zinc, aluminum, and iron. More preferably, the multivalent salt of the perchlorate anion is magnesium perchlorate, which is available from Aldrich Chemical (Milwaukee, Wis.). The improved decap agent is present in a range from about 0.01 to about 50 wt %, with about 0.1 to 10 wt % being preferred. As will be readily apparent to one of ordinary skill in the art, more than one improved decap agent may be used in the present invention.

The color ink-jet ink of the present invention comprises various components, including at least one cosolvent, at least one surfactant, a colorant, an improved decap agent, an aqueous carrier medium, and at least one buffer. The aqueous carrier medium may comprise water or a mixture of water and at least one water-soluble organic solvent. The color ink-jet ink may optionally include humectants, biocides, and/or viscosity modifiers, depending on the desired properties of the color ink-jet ink. The components of the color ink-jet ink are expressed in weight percent ("wt %") of the total ink formulation. The color ink-jet inks of the present invention are formulated by combining the various components. The purity of all the components is that employed in normal commercial practice for ink-jet inks.

The at least one cosolvent employed in the practice of this invention includes, but is not limited to, the classes of aliphatic alcohols, aromatic alcohols, diols, glycol ethers, poly(glycol) ethers, lactams, formamides, acetamides, and long chain alcohols. Examples of preferred cosolvents include diols, such as ethanediols (e.g., 1,2-ethanediol); propanediols (e.g., 1,2-propanediol, 1,3-propanediol, 2-ethyl-2-hydroxy-methyl-1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). The at least one cosolvent preferably employed in the practice of this invention includes, but is not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The most preferred at least one cosolvents are 1,5-pentanediol and 2-pyrrolidone, which are available from Aldrich Chemical (Milwaukee, Wis.). The at least one cosolvent is present in a range from about 0.01 to about 50 wt %, with about 0.1 to 20 wt % being preferred.

At least one water-soluble surfactant is used in the formulation of a color ink-jet ink. Surfactants are divided into two categories: (1) non-ionic and amphoteric surfactants and (2) ionic surfactants. Non-ionic and amphoteric surfactants include TERGITOLs, which are secondary alcohol ethoxylates available from Dow Chemical (Midland, Mich.); TRITONs, which are alkyl phenyl polyethylene oxide surfactants available from Rohm & Haas Co.; BRIJs; PLURONICs (polyethylene oxide block copolymers); SURFYNOLs (acetylenic polyethylene oxides available from Air Products); POE (polyethylene oxide) esters; POE diesters; POE amines; POE amides; and dimethicone copolyols. The non-ionic surfactants that are preferably used in this invention include Tergitol 15-S-5 and Tergitol 15-S-7, which are commercially available from Aldrich Chemical (Milwaukee, Wis.). Ionic surfactants, such as sulfonates, carboxylates, phosphates, phosphonates, sulfates and substituted amine oxides, are also used in the practice of this invention. The ionic surfactants that are preferably used in this invention include sulfonate derivatives, such as Dowfax 8390, available from Dow Chemical (Midland, Mich.). The concentration of surfactants employed in the present invention may range from 0 to 40 wt %, preferably from about 0.1% to 5 wt %.

The colorant may comprise a dye or pigment and be nonionic, cationic, anionic, or a mixture thereof. A dye is a colorant that is applied in a soluble state. A pigment is a colorant that is applied in an insoluble state. Preferably, the colorant of the present invention is a dye. Color dyes are well known in the art and are commercially available from numerous sources, such as Avecia (Wilmington, Del.) Mitsubishi Chemical Corporation (Tokyo, Japan), and Ilford AG (Rue de l'Industrie, Fribourg, Switzerland). Any color dyes known for use in color ink-jet printing may be employed in the practice of this invention. Color dyes include, but are not limited to cyan: Acid Blue 9, Direct Blue 199; magenta: Acid Red 52, Acid Red 289, Acid Red 388, Reactive Red 180, Reactive Red 23; yellow: Acid Yellow 23, and Acid Yellow 17. The color dyes are present in a range from about 0.1 to about 15 wt %, with about 0.1 to 10 wt % being preferred. The amount of dye necessary in the color ink-jet ink is largely dependent on the solubility of the dye in the particular ink, the desired color of the print to be achieved with the ink, and the purity and strength of the dye.

Buffers are employed in the practice of the invention to modulate the pH of the color ink-jet ink. The buffers can be organic-based biological buffers or inorganic buffers. Preferably, the buffers should be organic-based biological buffers because inorganic buffers may precipitate due to the large amounts of inorganic salts present in the ink. The buffers employed should provide a pH ranging from about 3 to about 9, preferably about 6 to about 9, and most preferably from about 7 to about 8. Examples of preferred buffers include Trizma Base, available from Aldrich Chemical (Milwaukee, Wis.); 4-morpholine ethane sulfonic acid (MES); 4-morpholinepropanesulfonic acid (MOPS); and beta-hydroxy-4-morpholinepropane-sulfonic acid (MOPSO).

Consistent with the requirements for this invention, various additives may be optionally employed in the ink to optimize its properties for specific applications. For example, it is well-known to those skilled in the art that biocides may be used in the ink to inhibit growth of microorganisms. In addition, sequestering agents such as EDTA may be included to eliminate deleterious effects of heavy metal impurities. Other known additives such as viscosity modifiers and other acrylic or non-acrylic polymers may be added to improve various properties of the ink as desired.

The color ink-jet ink of the present invention may be used to print color text and images on a paper substrate. The method of using the color ink-jet ink comprises formulating the color ink-jet ink with about 0.1 to 10 wt % of an improved decap agent comprising a multivalent salt of a perchlorate anion. The color ink-jet ink may be applied or printed adjacent to text or graphics applied or printed in black ink-jet. The color ink-jet ink achieves improved decap of the color ink-jet ink without affecting color-to-black bleed control.

The invention will now be further illustrated by, but not limited to, the following examples.

EXAMPLES

In the following examples, the short-time decap, long-time decap storage, and color-to-black bleed control of the perchlorate-containing color inks of the present invention were compared to color inks that contained magnesium nitrate salts or no salts. The perchlorate-containing color inks exhibited improved decap over the nitrate-containing and no salt-color inks while the color-to black bleed control was substantially unchanged.

Example 1

The cyan inks were prepared according to the formulations listed in Table 1.

TABLE 1

Cyan Ink Formulations

|  | Nitrate-containing cyan ink | Perchlorate-containing cyan ink | No salt cyan ink |
| --- | --- | --- | --- |
| 2-pyrrolidone | 6.5 wt % | 6.5 wt % | 6.5 wt % |
| Alkyl Diol | 8 | 8 | 8 |
| Trimethylolpropane | 7.5 | 7.5 | 7.5 |
| Tergitol 15-S-5 | 1 | 1 | 1 |
| Tergitol 15-S-7 | 1 | 1 | 1 |
| Sodium hexadecyl diphenyloxide disulfonate | 0.4 | 0.4 | 0.4 |
| Ammonium nitrate | 1 | 1 | 1 |
| EDTA-Sodium | 0.2 | 0.2 | 0.2 |
| Trizma base | 0.2 | 0.2 | 0.2 |
| Copper Pthalocyanine dye | 4 | 4 | 4 |
| Magnesium nitrate hexahydrate | 6 | — | — |
| Magnesium perchlorate anhydrous | — | 6 | — |
| Water | Remaining | remaining | remaining |

Example 2

The magenta inks were prepared according to the formulations listed in Table 2. The magenta dye is a nickel-containing dye available from various sources.

TABLE 2

Magenta Ink Formulations

|  | Nitrate-containing magenta ink | Perchlorate-containing magenta ink | No salt magenta ink |
| --- | --- | --- | --- |
| 2-pyrrolidone | 6.5 wt % | 6.5 wt % | 6.5 wt % |
| Alkyl Diol | 8 | 8 | 8 |
| Trimethylolpropane | 7.5 | 7.5 | 7.5 |
| Tergitol 15-S-5 | 1 | 1 | 1 |
| Tergitol 15-S-7 | 1 | 1 | 1 |
| Sodium hexadecyl diphenyloxide disulfonate | 0.4 | 0.4 | 0.4 |

TABLE 2-continued

Magenta Ink Formulations

|  | Nitrate-containing magenta ink | Perchlorate-containing magenta ink | No salt magenta ink |
| --- | --- | --- | --- |
| Ammonium nitrate | 1 | 1 | 1 |
| EDTA-Sodium | 0.2 | 0.2 | 0.2 |
| Trizma base | 0.2 | 0.2 | 0.2 |
| Nickel-containing magenta dye | 4 | 4 | 4 |
| Magnesium nitrate hexahydrate | 6 | — | — |
| Magnesium perchlorate anhydrous | — | 6 | — |
| Water | Remaining | remaining | remaining |

The ink formulations were filled into HP C6578D color pens and tested in an HP 970Cxi printer. Each of the ink formulations were tested to determine its short-time decap, long-time decap storage (2.5 and 20 hour), and color-to-black bleed control.

Example 4

The short-time decap of the ink formulations was measured to determine the time at which the first printer nozzle becomes weak or misdirected. First, the printhead was wiped off and all the nozzles were printed in a test pattern to verify that they were in working condition. The printhead was slewed in the air at a velocity of 20 inches per second for a fixed time without printing or spitting. Then, all the nozzles were printed in a second test pattern. The test patterns before and after slewing were compared to determine the number of weak or misdirected nozzles after the given amount of time. The process was repeated with incrementally increasing time intervals. Color inks with longer decap times result in color inks that can be left unused for longer periods of time without plugging the printer nozzles.

Figure 1:
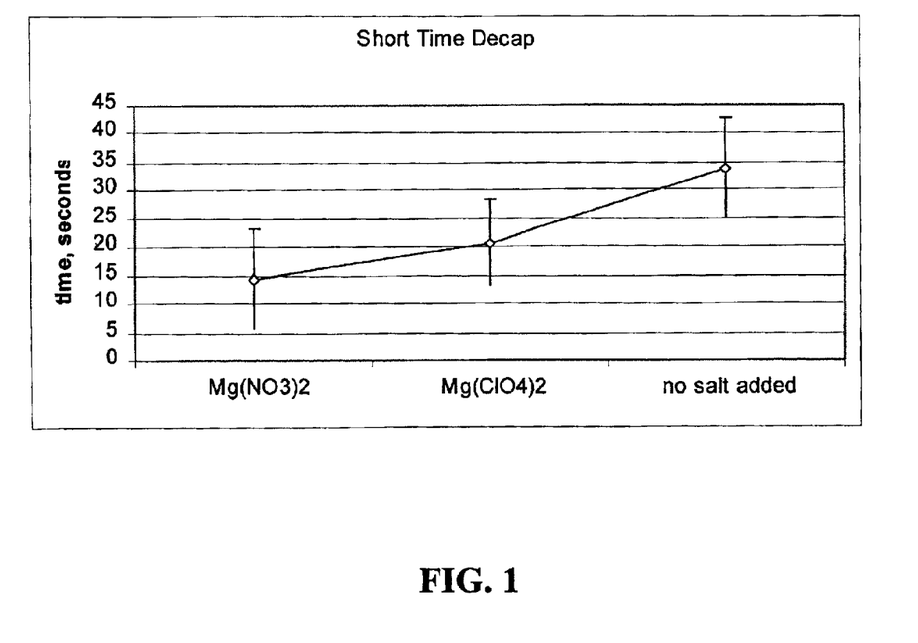
FIG. 1 shows the short-time decap of the cyan ink formulations.
Figure 2:
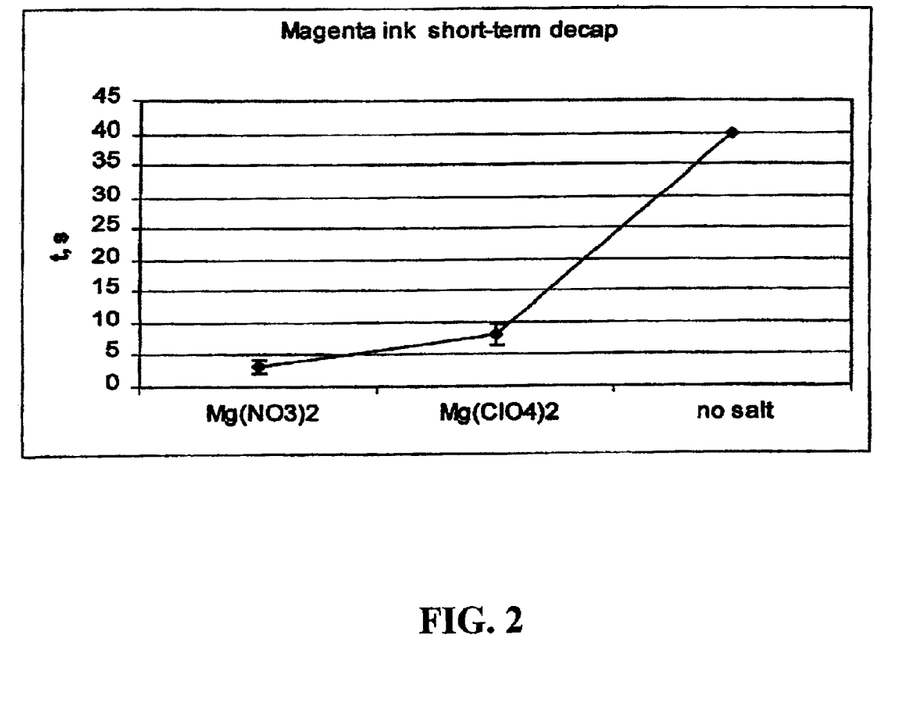
FIG. 2 shows the short-time decap of the magenta ink formulations.

Results for this test are shown in FIGS. 1 and 2, wherein the short-time decap of each color ink formulation is presented as the amount of time, in seconds, at which the first nozzle becomes weak or misdirected. As shown in FIG. 1, the perchlorate-containing cyan ink exhibited an improved short-time decap over the nitrate-containing cyan ink.

Similarly, as shown in FIG. 2, the perchlorate-containing magenta ink exhibited an improved short-time decap over the nitrate-containing magenta ink.

Example 5

The long-time decap storage of the ink formulations was measured by storing the printhead uncapped for 2.5 hours and for 20 hours. Before this test was performed, the HP 970Cxi printer was modified so that the servicing routines were disabled. The printhead was stored outside of the printer at 22EC and 30% humidity. After storage for the required amount of time, the printhead was inserted into the printer and three pages of the test pattern were printed in sequence. A fourth page was printed after a dry wipe of the printhead was performed. The long-time decap storage data is represented by a plot of the fraction of nozzles present versus the number of pages printed.

Figure 3:
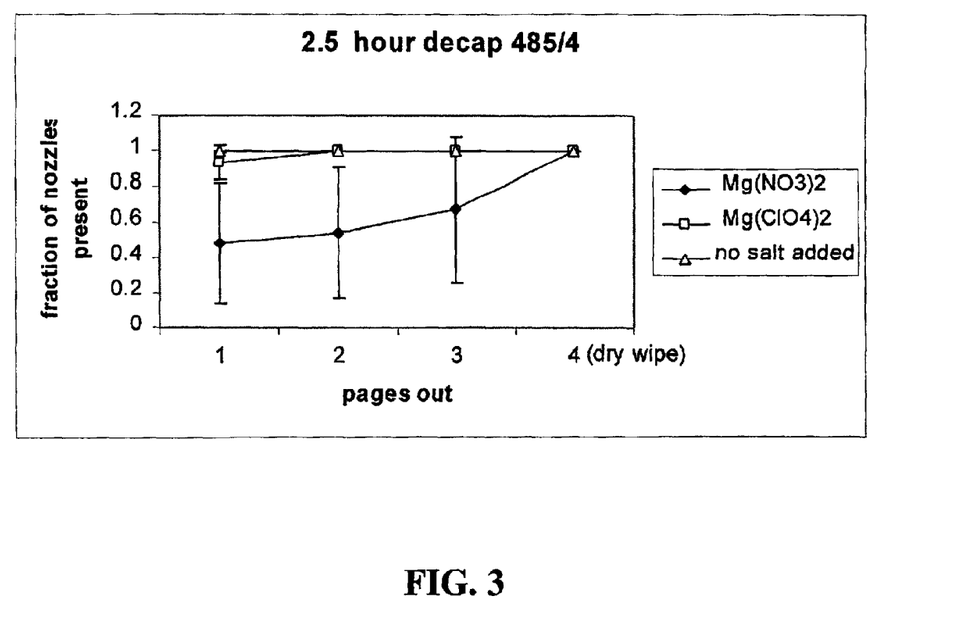
FIG. 3 shows the 2.5 hour long-time decap of the cyan ink formulations.

The long-time decap storage of the perchlorate-containing color inks was improved or unchanged in comparison to the nitrate-containing inks. After being stored for 2.5 hours, the perchlorate-containing cyan ink had a substantially improved long-time decap storage compared to the nitrate-containing cyan ink. As shown in FIG. 3, the perchlorate-containing cyan ink had almost all of its nozzles present when the first page was printed, compared to approximately 0.5 (50%) of the nozzles present for the nitrate-containing cyan ink. The nitrate-containing cyan ink had all of its nozzles present only after the dry wipe was performed and the fourth page was printed.

Figure 4:
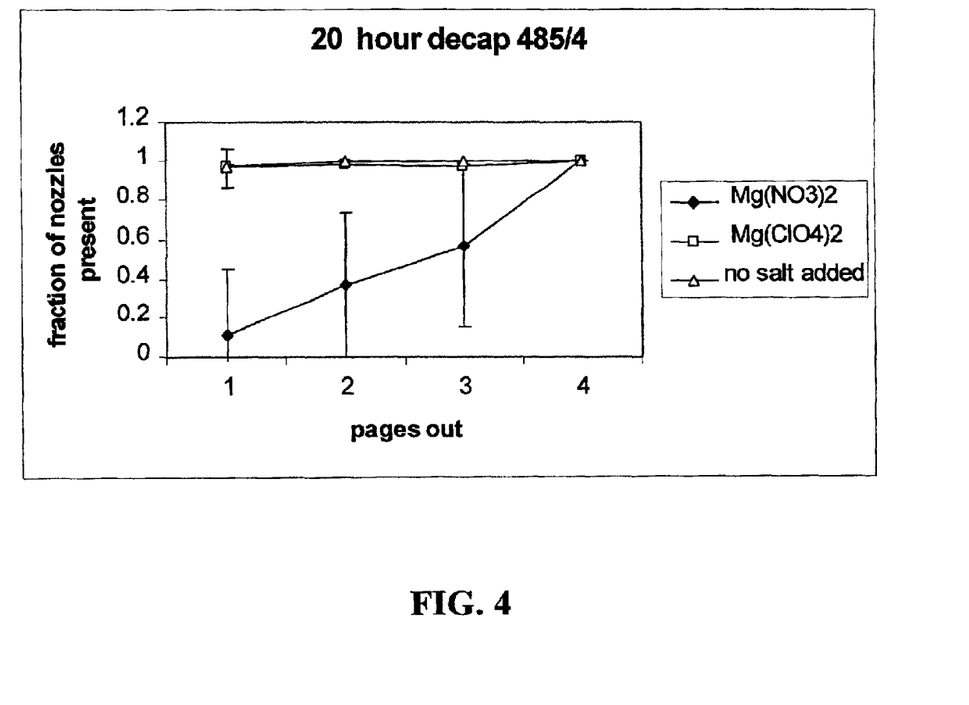
FIG. 4 shows the 20 hour long-time decap of the cyan ink formulations.

As shown in FIG. 4, the perchlorate-containing cyan ink also had a significantly improved long-time decap storage at 20 hours in comparison to the nitrate-containing cyan ink. The perchlorate-containing cyan ink had almost all of its nozzles present when the first page was printed, compared to less than 0.2 (20%) of the nozzles present for the nitrate-containing cyan ink. The nitrate-containing cyan ink had all of its nozzles present only after the fourth page was printed, or the dry wipe was performed.

Figure 5:
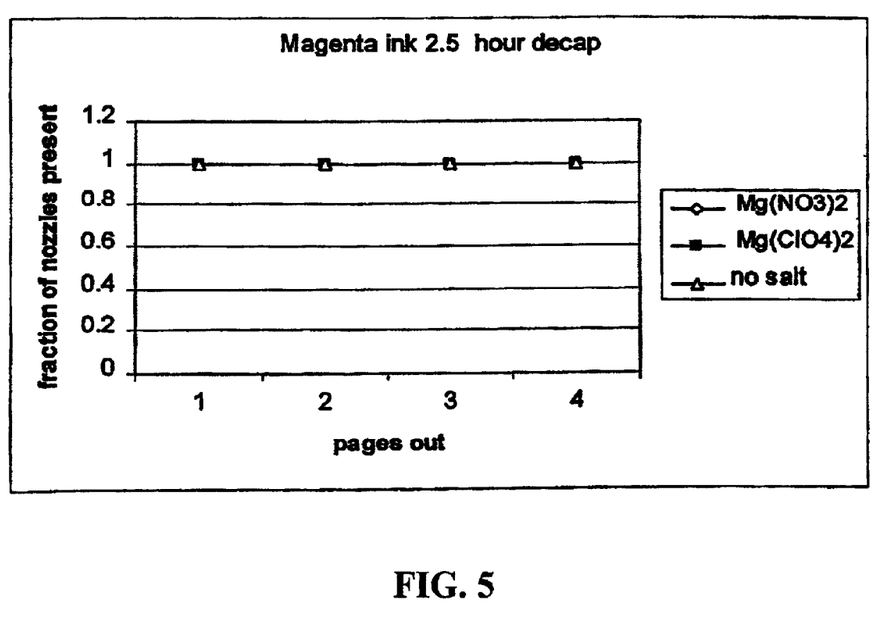
FIG. 5 shows the 2.5 hour long-time decap of the magenta ink formulations.
Figure 6:
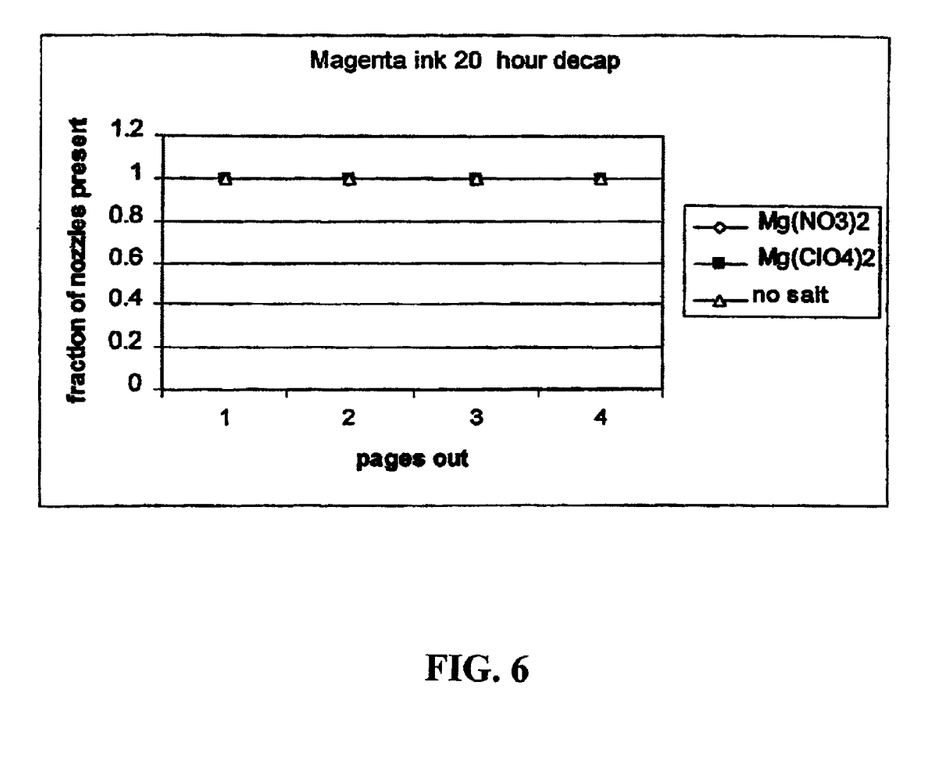
FIG. 6 shows the 20 hour long-time decap of the magenta ink formulations.

As is shown in FIGS. 5 and 6, the magenta inks exhibited no difference in long-time decap storage for the 2.5 hour and 20 hour storage times between the perchlorate-containing and nitrate-containing magenta inks.

Example 6

Bleed control was measured by determining the line-width gain and roughness factors of the color ink formulations on GILBERT 25% Cotton Bond (paper, available from (Mead). Good bleed control is shown by the least line width gain and the least line roughness factor. The line-width gain was measured by printing a 40 mm wide black bar directly adjacent to the color ink area. The difference in the width of the black bar between the areas touching and not touching the color ink area is the measure of the bleed control. The roughness factor was measured by comparing the contour length of the edge between two colors (or between a color and black area) to the length of the straight line. If the ratio of these two measurements is equal to one, it indicates that the edge is a perfect straight line. If the ratio is more than one, it indicates that the line is rough and that there has been some color-to-black bleed.

As evidenced by the bleed measurements in Table 3, the perchlorate-containing inks had comparable bleed measurements compared to the nitrate-containing inks. In the color combination column, kc represents the black bar in the cyan environment while km represents the black bar in the magenta environment.

TABLE 3

Bleed Measurements on GILBERT Bond Paper
Line-width gain, mils (1/1000th of an inch)

| Color | Nitrate | Perchlorate | no salt |
|---|---|---|---|
| Kc | 0.7 | 0.9 | 4.1 |
| Km | 0.7 | 1.1 | 2.1 |
| Average | 0.7 | 1.0 | 3.1 |
| Roughness | | | |
| Kc | 1.5 | 1.5 | 2.1 |
| Km | 1.6 | 1.6 | 2.1 |
| Average | 1.55 | 1.55 | 2.1 |

Table 3 shows that the perchlorate-containing and nitrate-containing cyan inks differed in their line-width gain by 0.2 mil and had identical roughness factors. The perchlorate-containing and nitrate-containing magenta inks differed in their line-width gain by 0.4 mil and had identical roughness factors. To compare the properties of the perchlorate-containing and nitrate-containing inks, the data for the two perchlorate-containing inks were averaged, while the data for the two nitrate-containing inks were also averaged. These averages show that while the perchlorate-containing inks have slightly larger line width gains than the nitrate-containing inks, the roughness factors are identical.

In view of the foregoing, the perchlorate-containing inks demonstrate improved short-time decap and improved or unchanged long-time decap in comparison to the nitrate-containing inks. The perchlorate-containing inks also exhibited comparable color-to-black bleed control in comparison to the nitrate-containing inks. Therefore, improvement in decap of the perchlorate-containing inks is achieved without affecting the color-to-black bleed control of the inks.

The specific color ink-jet inks disclosed herein are expected to find commercial use in thermal ink-jet color printers. The method of using the color ink-jet ink of the present invention is expected to find use in ink-jet printing applications involving the printing of color and black inks.

Thus, there has been disclosed a color ink-jet ink and a method of using the color ink-jet ink. It will be readily apparent to those skilled in this art that various changes and modifications may be made without departing from the spirit of the invention, and all such changes and modifications are considered to fall within the scope of this invention as defined by the appended claims.

What is claimed is:

1. An ink-jet ink having improved decap time and color-to-black bleed control, comprising:
    at least one component selected from the group consisting of a cosolvent, a surfactant, and a buffer;
    at least one dye; and
    a decap agent comprising a multivalent salt of a perchlorate anion, the decap agent formulated to provide an increased decap time to the ink-jet ink without affecting color-to-black bleed control of the ink-jet ink, wherein the ink-jet ink does not include a quaternary amine compound.

2. The ink-jet ink of claim 1, wherein the dye comprises a cyan dye.

3. The ink-jet ink of claim 1, wherein the dye comprises a yellow dye.

4. The ink-jet ink of claim 1, wherein the dye comprises a magenta dye.

5. The ink-jet ink of claim 1, wherein the decap agent is selected from the group consisting of calcium perchlorate, manganese perchlorate, magnesium perchlorate, zinc perchlorate, aluminum perchlorate, and iron perchlorate.

6. The ink-jet ink of claim 1, wherein the decap agent is magnesium perchlorate.

7. The ink-jet ink of claim 1, wherein the ink-jet ink comprises from about 0.1 weight percent ("wt %") to about 10 wt % of the multivalent salt of the perchlorate anion.

8. The ink-jet ink of claim 1, wherein the ink-jet ink comprises about 6 wt % of the multivalent salt of the perchlorate anion.

9. The ink-jet ink of claim 1, wherein the surfactant is selected from the group consisting of at least one ionic and at least one non-ionic surfactant.

10. The ink-jet ink of claim 9, wherein the at least one ionic surfactant comprises at least one sulfonate derivative.

11. The color ink-jet ink of claim 9, wherein the at least one non-ionic surfactant comprises at least one secondary alcohol ethoxylate compound.

12. A method of printing on a substrate with an ink-jet ink, comprising:

formulating a color ink-jet ink comprising a cosolvent, a surfactant, a buffer, a dye, and a decap agent, wherein the color ink-jet ink does not include a quaternary amine compound and wherein the decap agent comprises a multivalent salt of a perchlorate anion and is formulated to provide an increased decap time to the color ink-jet ink without affecting color-to-black bleed control of the color ink-jet ink;

applying the color ink-jet ink on a paper substrate; and applying a black ink-jet ink adjacent to the color ink-jet ink.

13. The method of claim 12, wherein formulating a color ink-jet ink comprising a decap agent comprises formulating the color ink-jet ink with a decap agent selected from the group consisting of calcium perchlorate, manganese perchlorate, magnesium perchlorate, zinc perchlorate, aluminum perchlorate, and iron perchlorate.

14. The method of claim 12, wherein formulating a color ink-jet ink comprising a decap agent comprises formulating the color ink-jet ink wherein the decap agent is magnesium perchlorate.

15. The method of claim 12, wherein formulating a color ink-jet ink comprising a decap agent comprises formulating the color ink-jet ink to include from about 0.1 weight percent ("wt %") to about 10 wt % of magnesium perchlorate.

16. The method of claim 12, wherein formulating a color ink-jet ink comprising a decap agent comprises formulating the color ink-jet ink to include about 6 wt % of magnesium perchlorate.

17. A method of improving decap without affecting color-to-black bleed control of a color ink-jet ink, comprising:

formulating a color ink-jet ink comprising a cosolvent, a surfactant, a buffer, at least one dye, and a decap agent, wherein the decap agent comprises a multivalent salt of a perchlorate anion and is formulated to provide an increased decap time to the ink-jet ink without affecting color-to-black bleed control of the ink-jet ink and wherein the color ink-jet ink does not include a quaternary amine compound.

18. The method of claim 17, wherein formulating a color ink-jet ink comprising a decap agent comprises formulating the color ink-jet ink with the decap agent selected from the group consisting of calcium perchlorate, manganese perchlorate, magnesium perchlorate, zinc perchlorate, aluminum perchlorate, and iron perchlorate.

19. The method of claim 17, wherein formulating a color ink-jet ink comprising a decap agent comprises formulating the color ink-jet ink wherein the decap agent is magnesium perchlorate.

20. The method of claim 17, wherein formulating a color ink-jet ink comprising a decap agent comprises formulating the color ink-jet ink to include from about 0.1 weight percent ("wt %") to about 10 wt % of magnesium perchlorate.

21. The method of claim 17, wherein formulating a color ink-jet ink comprising a decap agent comprises formulating the color ink-jet ink to include about 6 wt % of magnesium perchlorate.

* * * * *